United States Patent

Kaneko et al.

[11] Patent Number: 5,897,792
[45] Date of Patent: Apr. 27, 1999

[54] POWER SUPPLY SYSTEM FOR ELECTRICAL DISCHARGE MACHINING UNIT, AND METHOD FOR ELECTRICAL DISCHARGE MACHINING

[75] Inventors: Yuji Kaneko; Tatsuo Toyonaga, both of Yokohama, Japan

[73] Assignee: Sodick Co., Ltd.

[21] Appl. No.: 08/696,963

[22] PCT Filed: Dec. 8, 1995

[86] PCT No.: PCT/JP95/02624

§ 371 Date: Aug. 21, 1996

§ 102(e) Date: Aug. 21, 1996

[87] PCT Pub. No.: WO96/19311

PCT Pub. Date: Jun. 27, 1996

[30] Foreign Application Priority Data

Dec. 21, 1994 [JP] Japan ................................ 6-335855

[51] Int. Cl.⁶ ............................................... B23H 1/02
[52] U.S. Cl. ............................................... 219/69.18
[58] Field of Search ........................ 219/69.13, 69.18; 205/658

[56] References Cited

U.S. PATENT DOCUMENTS

| 2,969,482 | 1/1961 | Bruma et al. | 219/69.18 |
| 3,624,338 | 11/1971 | Ellis et al. | 219/69.13 |
| 3,775,578 | 11/1973 | Verner | 219/69.13 |
| 4,017,705 | 4/1977 | Bazhenov | 219/69.13 |
| 4,447,695 | 5/1984 | Inoue | 219/69.18 |
| 5,064,984 | 11/1991 | Yamamoto et al. | 219/69.13 |
| 5,750,951 | 5/1998 | Kaneko et al. | 219/69.18 |
| 5,770,831 | 6/1998 | Kaneko et al. | 219/69.18 |

FOREIGN PATENT DOCUMENTS

2-279214  11/1990  Japan.
7-266138  10/1995  Japan.

Primary Examiner—Geoffrey S. Evans

[57] ABSTRACT

A power supply circuit (8) incorporates a DC power supply (8A), a switching element (8B), and a diode (8C). A transformer (12) incorporates a ring core (13), a primary windings (13B), and secondary windings (13C). The switching element (8B) goes ON and OFF on the basis of a signal pulse supplied from a pulse generating device (5), so that a DC current pulse is supplied to the primary side of the transformer (12). An inverting device (15) connected across the power supply circuit (8) and transformer (12) incorporates switches (151), (152), (153), and (154), and is controlled by a signal from a relay circuit. When the switches (151) and (152) are closed, the switches (153) and (154) are open. The first half-wave of the voltage pulse of the current induced on the secondary side of the transformer (12) is supplied to a machining gap formed between a wire (1) and work piece (3) in the direction of the work piece (3). The subsequent half-wave is then supplied to the machining gap in the direction of the wire (1). At this time, the voltage waveform of the current pulse is biased to the positive side in terms of the potential of the work piece with respect to the wire (1). Thus, undesirable coating of the material of the wire (1) onto the surface of the work piece (3) is prevented. When the switches (151) and (152) are opened and the switches (153) and (154) are closed, the AC current pulse induced on the secondary side of the transformer (12) is biased to the negative side.

14 Claims, 6 Drawing Sheets

POWER SUPPLY SYSTEM FOR ELECTRICAL DISCHARGE MACHINING UNIT, AND METHOD FOR ELECTRICAL DISCHARGE MACHINING

TECHNOLOGICAL FIELD

The present invention relates to a power supply system for an electrical discharge machining (EDM) unit that supplies an AC pulse to a machining gap formed between a working electrode and a work piece to machine the work piece. In particular, the present invention relates to an ideal power supply system for an electrical discharge machining unit that converts a DC pulse from a DC power supply to an AC pulse, and supplies the AC pulse to the machining gap, to cause an electrical discharge to machine the work piece.

In addition, the present invention relates to an electrical discharge machining method for preventing the undesirable coating of electrode material onto the surface of the work piece that occurs when a work piece is being electrically discharge machined using an AC pulse power supply system.

TECHNOLOGICAL BACKGROUND

Electrical discharge machines are typically divided into a mechanical device featuring a member that supports the work piece and a mechanical member that moves the working electrode and the work piece relative to one another, and a power supply device that is invariably located at a physical distance from the mechanical device and that generates a power pulse. The power supply device generally includes an electrical circuit that generates a power pulse, a control device that controls the amount of energy in the power pulse and its ON and OFF tines, and a control device that controls the relative movement of the working electrode and work piece with respect to one another. The power supply device is connected by a suitable conductor to the mechanical device bearing the work piece and working electrode. Some of the elements which comprise the electrical discharge circuit are physically positioned on the mechanical device, e.g., the lead wires and the conductive members connecting the lead wires and electrode. These elements may be regarded as part of the power supply device.

Such an electrical discharge machine may feature a known power supply system of a type that supplies an AC voltage to the machining gap to machine the work piece.

Particularly in machining process where a water-base machining fluid is used, electrical discharge machines that employ an AC power pulse to machine the work piece enable the average voltage at the machining gap to be brought to substantially zero, making it possible to prevent electrolysis that corrodes the machined surface.

Power supply systems that supply AC voltage include systems that operate by converting a high-frequency DC pulse into an AC pulse, and supplying the high-frequency AC pulse to the machining gap. In concrete terms, these systems are provided with at least a DC power supply and a switching element, and means for turning the switching element ON and OFF in response to a specified signal from a pulse emitting device so as to generate a continuous high-frequency DC pulse having a specified ON time and OFF time. The high-frequency DC voltage is converted into an AC pulse by means of a transformer, and the high-frequency AC pulse is supplied to the machining gap.

Although this type of device will deliver comparatively small amounts of energy in the individual power pulses when used to supply several µs (microsecond)-long power pulses of AC current per cycle, it can still deliver sufficiently large amounts of energy in a given unit time. This principle allows machining to be carried out quickly without compromising the desired surface roughness. Moreover, wire-cut electrical discharge machines that use a wire as the working electrode to cut the work piece can furnish a large voltage at the wire electrode regardless of the small amounts of energy per cycle, enabling a reduction in the amplitude of wire electrode oscillation. As a result, such devices can be used to machine work pieces to a better configurational accuracy and a lower roughness on the machined surface.

Despite such advantages, however, electrical discharge machines that supply an AC pulse to machine the work piece have the drawback of frequently allowing the electrode material (depending on the electrode and work piece material) to stick to the work piece and coat its surface. This coating is particularly marked when the work piece material is tungsten carbide containing cobalt (WC—Co) or copper (Cu), and the electrode material is copper (Cu) or brass (Cu—Zn). In order to obtain a finished product from the work piece, the surface must be ground or subjected to other treatment to remove this coating. A thick coating of electrode material on the surface of the work piece can sometimes prevent the desired surface roughness from being obtained.

In the past, the AC voltage pulse waveforms provided at the machining gap by power supply systems that convert a DC pulse into an AC pulse were regarded as being substantially sinusoidal. However, under careful study, the waveform of such AC voltage pulses was revealed to be formed such that the potential of the work piece with respect to the electrode was biased to a negative polarity. For ease of explanation, when the work piece is positive and the electrode negative, the voltage will be designated as being positive, and as being negative in the opposite situation.

Even if a sinusoidal voltage pulse is supplied, this undesirable coating frequently occurs. Accordingly, even when a sinusoidal AC voltage pulse waveform is obtained in this type of electrical discharge machine by adjusting the ON and OFF timing of the switching element by a frequency corresponding to a constant of the power supply circuit so as to shape the voltage waveform of the AC pulse, the problem of undesirable coating remains difficult to solve. Moreover, simply performing such an operation with this type of device is difficult in and of itself.

In order to solve this problem, the present inventors have supplied an AC voltage pulse having a waveform biased to a positive polarity to carry out repeated machining of numerous work pieces, and found that this undesirable coating was virtually eliminated.

On the other hand, when the work piece material was e.g. steel (Fe), the absence of coating was marked. When a high-frequency AC voltage pulse biased to a positive polarity was then supplied and a steel work piece was machined, there was an even greater effect on the roughness of the machined surface.

The present invention has been conceived in the light of the above situation, and has the purpose of providing a power supply system that is constituted so as to supply an AC pulse to the machining gap, that is particularly suited devices that convert a DC pulse into an AC pulse and supply the AC pulse to the machining gap, and that is capable of preventing the undesirable coating of electrode material that can stick to the surface of the work piece.

Moreover, the purpose of the present invention is to provide a power supply system for electrical discharge machines with which the waveform of the high-frequency AC pulse supplied to the machining gap can be selectively biased in response to machining conditions that include differences in work piece materials to a positive polarity or a negative polarity, viewed in terms of the potential of the work piece with respect to the electrode, to machine the work piece.

Other purposes of the present invention will be discussed in part in the following explanation, and will in part be revealed by means of the described embodiments to those skilled in the art.

DISCLOSURE OF THE INVENTION

In order to achieve the aforementioned objectives, a power supply system according to the present invention comprises a power supply system for electrical discharge machines that supplies a power pulse to a machining gap formed by a tool electrode and a work piece so as to machine the work piece by electrical discharge, the power supply system comprising a serial circuit that includes a DC power supply and at least one switching element;

a pulse generating means that supplies a specified gate pulse having a specified ON time and OFF time for turning the switching element ON and OFF;

a conversion means between the machining gap and the serial circuit for converting the DC pulse of the serial circuit to an AC pulse; and an inverting means between the machining gap and the serial circuit for inventing the direction in which the AC pulse is supplied to the machining gap.

Preferably, the conversion means contains a ring core, at least one primary winding that is wound on the ring core and connected to the serial circuit, and at least one secondary winding that is wound upon the ring core and connected to the machining gap.

More preferably, the inverting means incorporates a plurality of switches that switch the connection between the DC power supply and the machining gap. It is yet more preferable that these switches be relay switches.

Further, a power supply system according to the present invention may comprise a power supply system for electrical discharge machines that supplies a power pulse to a machining gap formed by a tool electrode and a work piece so as to machine the work piece by electrical discharge, wherein the power supply system includes a serial circuit that incorporates a DC power supply and at least one switching element;

a pulse generating means that supplies a specified gate pulse having a specified ON time and OFF time for turning the switching element ON and OFF;

a conversion means between the machining gap and the serial circuit for converting the DC pulses of the serial circuit to AC pulses; and a bias power supply device including a DC bias power supply connected to two terminals on a circuit path connecting the conversion means and the machining gap, switches respectively provided between the ends of the DC bias power supply and the two terminals, and switches provided between the two terminals on the circuit path.

The electrical discharge machining method according to the present invention may comprise an electrical discharge machining method for supplying a power pulse to a machining gap formed by a tool electrode and a work piece so as to machine the work piece by electrical discharge, the method comprising the steps of:

controlling at least one switching element to be ON and OFF to thereby generate a DC pulse having a specified ON time and OFF time;

converting the DC pulse to an AC pulse;

the AC pulse having an average voltage which is biased either positive or negative relative to the potential of the work piece with respect to the working electrode; and biasing the AC pulse supplied to the machining gap to machine the work piece to the opposite polarity of said average voltage.

Moreover, the electrical discharge machining method according to the present invention comprises a method for supplying a power pulse to a machining gap formed by a working electrode and a work piece so as to machine the work piece by electrical discharge, wherein controlling at least one switching element ON and OFF to cause a DC pulse having a specified ON time and OFF time to be generated, converting the DC pulse into an AC pulse, the AC pulse being biased so that its average voltage is negative relative to the potential of the work piece with respect to the working electrode, and supplying the negatively biased AC pulse to the machining gap, machining the work piece and thereby preventing undesirable coating of the electrode material onto the surface of the work piece.

BRIEF DESCRIPTION OF THE FIGURES

FIG. 4 illustrates waveforms for current or voltage in the present invention, where FIG. 4A illustrates the signal pulse from the pulse generating means, FIG. 4B the waveform of the current pulse supplied to the primary side of the transformer, FIG. 4C the waveform of the AC voltage pulse output from the transformer as seen in terms of potential of the work piece with respect to the electrode, and FIG. 4D the various waveforms of the current flowing at the gap.

PREFERRED EMBODIMENTS OF THE PRESENT INVENTION

Figure 1:
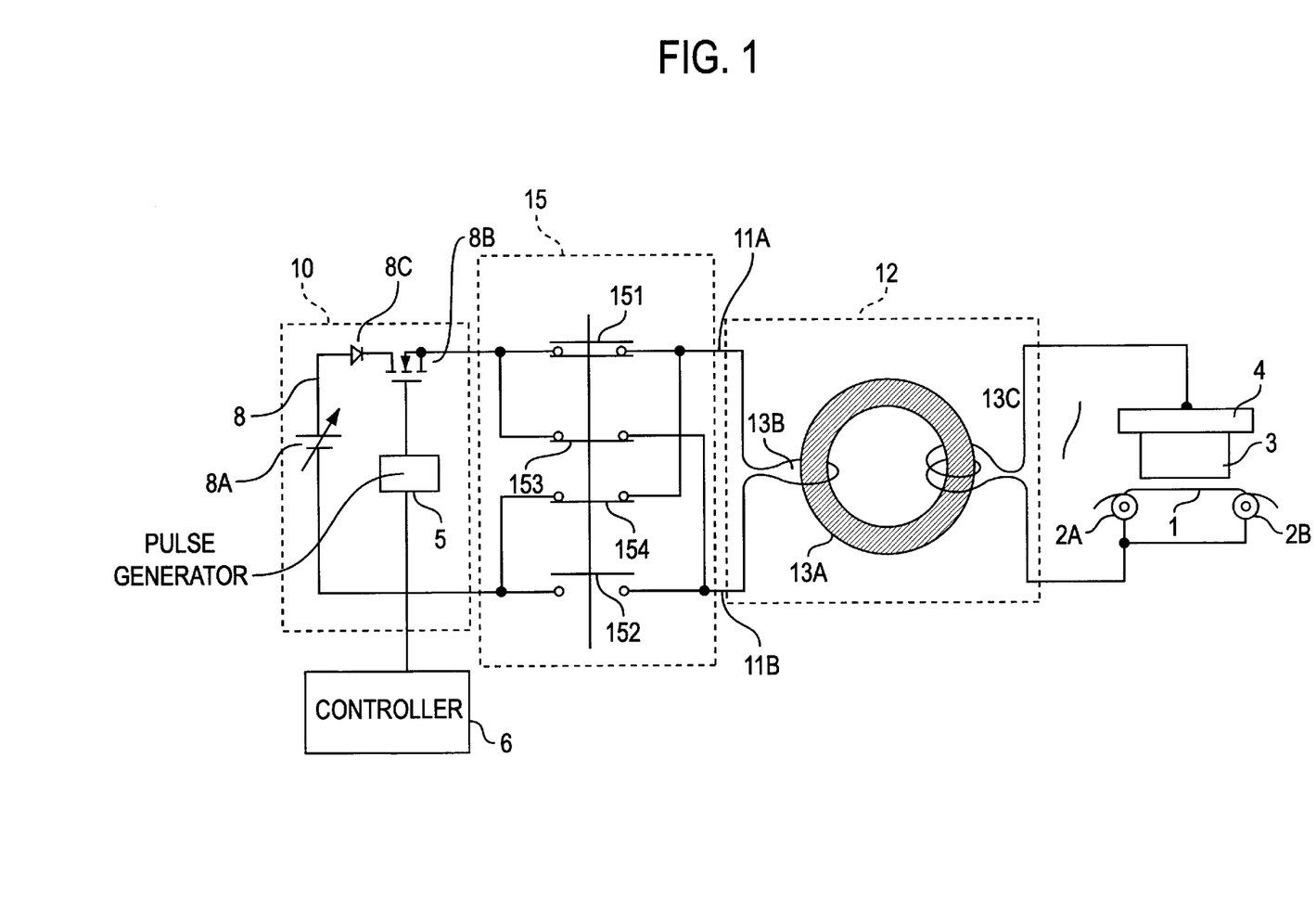
FIG. 1 illustrates a power supply system for a wire-cut electrical discharge machining unit according to an embodiment of the present invention.

FIG. 1 illustrates a power supply system for a wire-cut electrical discharge machining unit according to an embodiment of the present invention. Unless otherwise noted, the following explanation concerns wire-cut electrical discharge machining in which a water-base machining fluid is used.

As the working tool, a wire electrode (1) composed of brass is used. This wire (1) is held under a specified tension, and is guided through a specified course by a pair of wire guides (2A) and (2B). In the present embodiment, the wire guides (2A) and (23) can also be used as members for supplying current to the wire.

Reference numeral (3) denies a work piece that is provided at a specified gap from the wire (1) and held by a work stand (4).

The electrical discharge circuit incorporates a power supply circuit (8), an inverting device (15), a cable (11), a transformer (12) for converting DC into AC, the wire (1), and the work piece (3).

The power supply circuit (8) incorporates a variable DC power supply (8A), a field effect transistor (MOS-FET) (8B) comprising a switching element, and a diode (8C) that prevents reverse flow of current; the elements of the power supply circuit (8) being connected in series. If a plurality of MOS-FETs (8B) are connected together in parallel between the DC power supply (8A) and the transformer (12), it will be possible to increase the current value of the current pulse supplied to the primary side of the transformer (12). Since this power supply circuit (8) has no limiting resistance, one way of obtaining a current pulse waveform having the sharpest possible rises and falls is to turn the MOS-FET (8B) OFF before a current value that would damage the MOS-FET (8B) is reached. The ability of the power supply circuit (8) to produce current pulses having sharp rise and fall times allows it to supply high-frequency pulses of 1 MHz (megahertz) or above. A signal pulse having a preset ON time and OFF time is supplied from the pulse generating device (5) to the gate of the MOS-FET (8B) on the basis of a control signal from a control device (6), and the MOS-FET (8B) goes ON and OFF on the basis of this signal pulse.

The transformer (12) incorporates a primary winding (13B) wound once upon a ring core (13A), and a secondary winding (13C) wound twice upon the ring core (13A), and is used as a device for converting DC) into AC. The ring core (13A) is preferably composed of ferrite, and is designed so as to withstand becoming magnetically saturated when a current pulse is supplied to the primary winding (13B) from the power supply device (10). This ring core (13) is more effective when it consists of two ring cores (13A). The transformer (12) is preferably provided in close proximity to the machining part of the electrical discharge machine.

The secondary side of the transformer (12) is essentially connected to the wire (1) and work piece (3). The wire (1) and work piece (3) are provided at a suitable distance from one another, forming the machining gap.

The inverting device (15) incorporates synchronously operating switches (151), (152), (153), and (154). These switches are relay switches, and are controlled on the basis of a relay signal from a relay circuit (not illustrated) to ensure that current can be supplied to the primary winding without shorting the electrical discharge circuit. The inverting device (15) is provided between the power supply device (10) and the transformer (12). The power supply device and the mechanical device are connected by power lines (11A) and (11B) such as coaxial cables or shielded cables. In the embodiment illustrated in FIG. 1, the inverting device (15) is provided on the power supply device (10) side.

Figure 4A:
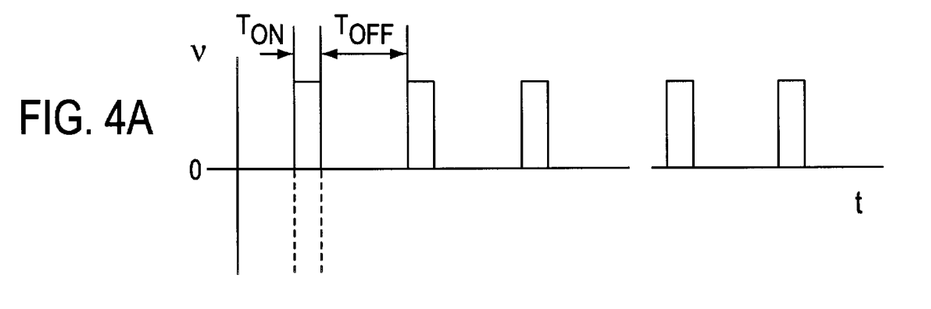

On the basis of a command from the control device (6), a signal pulse supplied from the pulse generating device (5) and having e.g. an ON time T(ON) of 100 ns (nanoseconds) and an OFF time T(OFF) of 1μ, such as illustrated in FIG. 4A, is supplied to the gate of the MOS-FET (8B). At this time, the switches (151) and (152) of the inverting device (15) illustrated in FIG. 1 are closed, and the switches (153) and (154) are open.

Figure 4B:
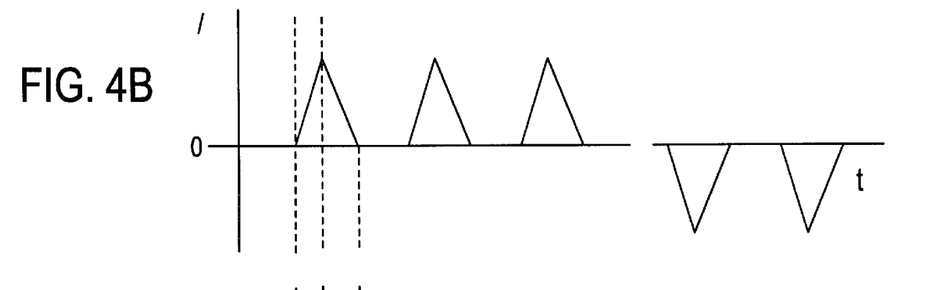
Figure 4C:
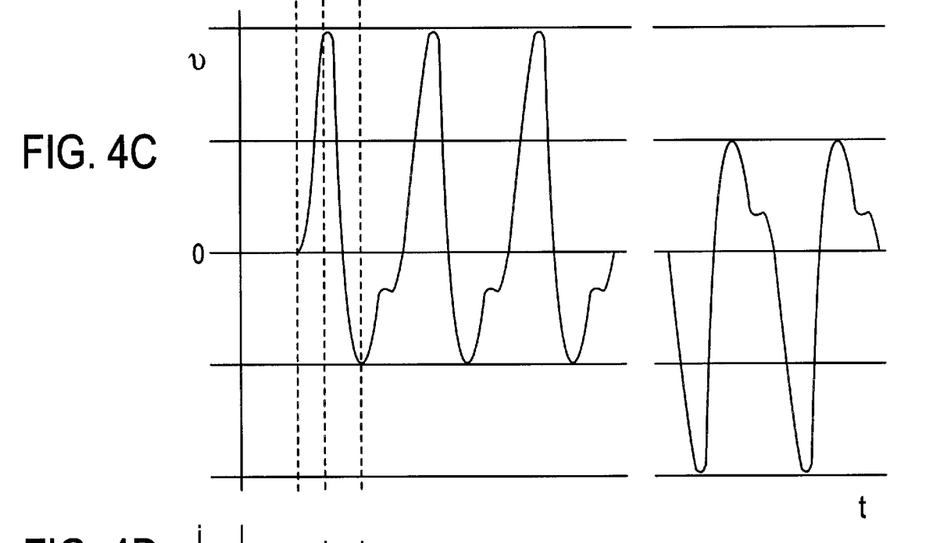
Figure 5:
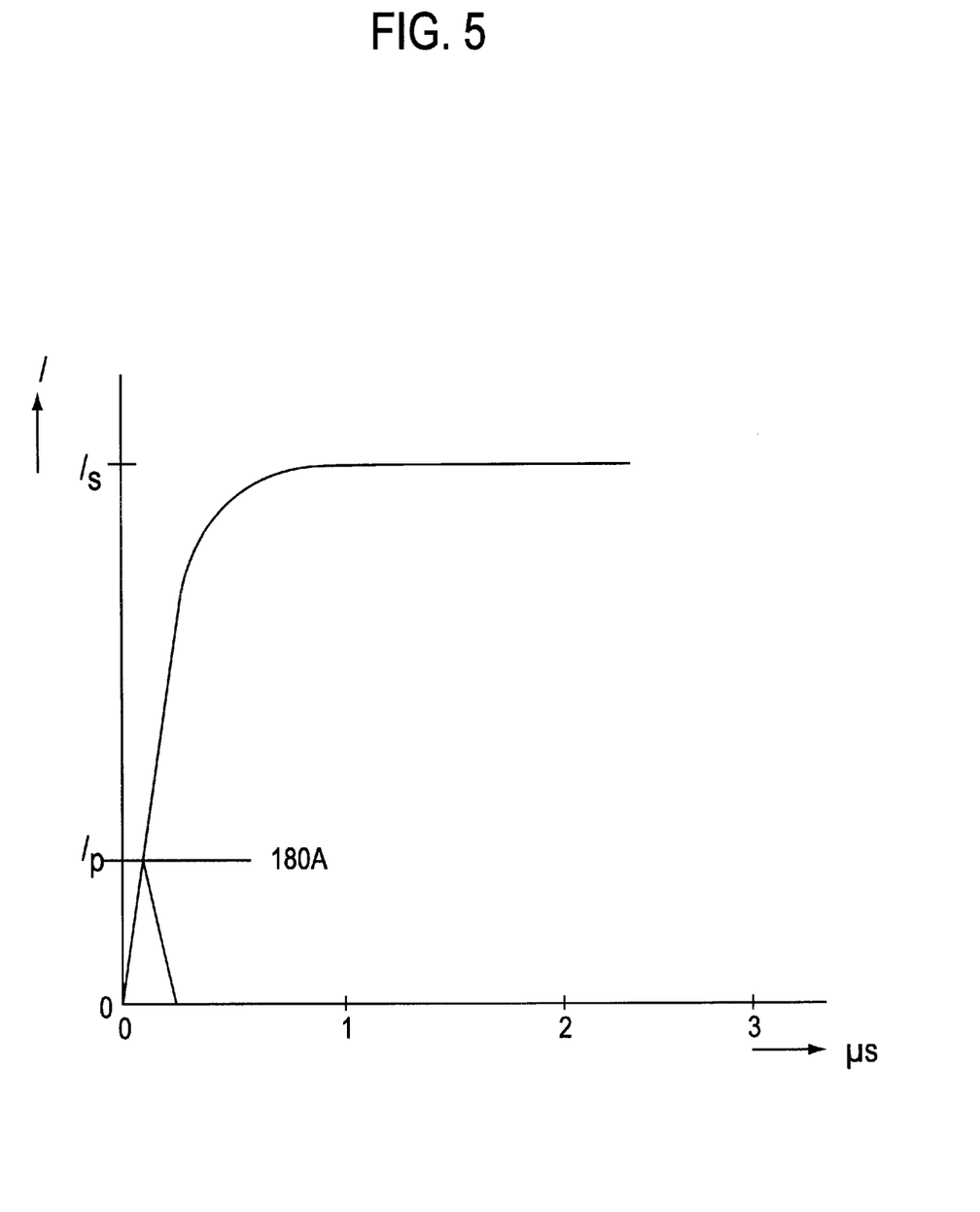
FIG. 5 illustrates the current rise characteristics when using a MOS-FET as the switching element for generating a pulse current.

At this time, as illustrated in FIG. 5, the MOS-FETs which comprise the switching element (8B) are ON, depending on the MOS-FETs' characteristics, so that it takes loner for the current value to drop to an essentially blocked condition after the MOS-FETs have been turned OFF than it does for the current to reach its required peak value after the MOS-FETs have been turned ON. While this period of time is extremely belief, the difference between the current's rise time and fall time rows greater as higher peak values are required for the current. For this reason, a current pulse such as that illustrated in FIG. 4B having a waveform whose fall time is longer than its rise time is supplied to transformer's primary side. The voltage (V) induced on the transformer's secondary side with respect to current (1) is expressed by V dI/dt (where t is time), and is proportional to the change in current (1) Accordingly, as illustrated in FIG. 4C, observation with a synchroscope shows that the seemingly sinusoidal waveform for the voltage pulse of the current induced on the secondary side of the transformer is, in fact, not sinusoidal. The second half of the waveform of this voltage pulse for one cycle of current is smaller than its first half-wave as seen in terms of the potential of the work piece with respect to the wire, and is biased to a positive polarity. The characteristics of the switching elements are not the sole cause of the bias in the current pulse's voltage waveform, but are one of the major factors at work. The current value $I_s$ in FIG. 5 is expressed by the relation $I_s=E/R$ when the voltage and resistance of the power supply circuit (8) incorporating the DC voltage supply and the switching elements are designated E and R, respectively, and represents the maximum current value that can be supplied with this circuit. Since the power supply circuit (8) has no current-limiting resistance under this scenario, the resistance R consists principally of the resistance value present in the circuit path. The current $I_s$ illustrated in FIG. 5 is the current value supplied to the primary side of the transformer (12). For example, when $I_p$ illustrated in the figure is 180 A (amperes), it is expressed by the sum value obtained when a plurality of MOS-FETs connected to one another in parallel are used. Although MOS-FETs were cited in this example, the same also holds for switching transistors or other switching elements as well as for MOS-FETS.

Figure 4D:
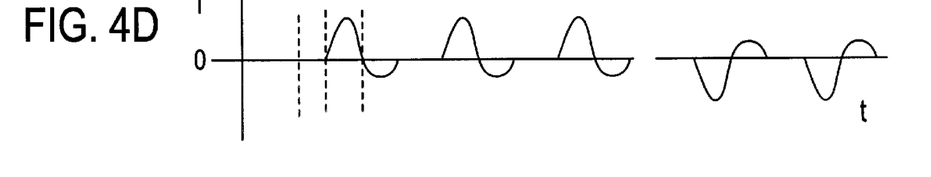

As illustrated in FIG. 4C, when the work piece is made positive in the machining gap and the first half-wave of the current voltage pulse cycle is supplied to the positive side, an electrical discharge is emitted at the machining gap, and a specified current flows from the work piece to the wire as illustrated in FIG. 4D. When the work piece is then made negative and the next half-wave of the cycle is supplied to the negative side, an electrical discharge is emitted at the machining gap, and current flows from the wire to die work piece as illustrated in FIG. 4D.

When the work piece is machined with the average value of the AC voltage being biased to a positive polarity referenced by the work piece potential with respect to the wire, no copper or zinc from the material of the wire is coated onto the surface of cobalt-containing tungsten carbide work pieces.

On the other hand, when switches (151) and (152) of the inverting device (15) are opened and switches (153) and (154) are closed, the voltage waveform of the current supplied to the gap appears substantially inverted, as shown in the latter half of FIG. 4C. For this reason, the average value of the AC voltage is biased to a negative polarity as referenced by the potential of the work piece with respect to the wire electrode. If the average value of the AC voltage is biased to a negative polarity, ideal surface roughness will be obtained when machining steel work pieces.

The decision of whether to bias the voltage to a positive polarity or negative polarity depends on the work piece material. The direction in which the voltage pulse is supplied can be inverted at any time from the beginning to the end of the machining process. For example, the effect of the present embodiment can still be obtained when the voltage bias direction is inverted during any of the several machining steps performed in the latter half of the machining process.

In the present embodiment, when brass is used as the wire electrode material and cobalt containing tungsten carbide as the work piece material, the AC voltage pulse is biased to a positive polarity relative to the potential of the work piece. The initial machining process in which the surface of the work piece is cut is typically followed by three "second cut" machining processes in which the wire electrode is moved relative to the cut surface to reduce its roughness, i.e.,the work piece is machined in four machining processes. As a result, the roughness of the machined surface obtained is approximately 1.1–2.4 (Rmax), which is an ideal outcome. Trace analysis by electron probe (EPMA analysis) shows the value of copper or zinc from the wire coated onto the machined surface to be approximately 540 cps (Zn—K value), a result that can be regarded as indicating substantially no coating.

A work piece composed of copper was machined with the waveform of the AC voltage pulses biased to a positive polarity relative to the work piece potential, with the result that the roughness of the machined surface obtained in four machining processes was approximately 1.4–2.4 (Rmax). The value of brass from the wire coated onto the machined surface was substantially the same as when the work piece consisted of cobaltcontaining tungsten carbide, and could be regarded as indicating that substantially no coating had occurred.

When the wire was brass, the work piece was steel, and four machining process were carried out with the waveform of the AC voltage pulses biased to a negative polarity relative to the work piece, the roughness of the machined surface obtained was approximately 1.8–2.5 (Rmax). However, when the waveform was biased to a positive polarity and the work piece was machined in the same way, the roughness of the machined surface obtained was on the order of 1.5 (Rmax). Given that the same roughness was anticipated for the machined surface in the machining operation where the waveform was biased to a positive polarity, an effect of increased machining speed was obtained. When the work piece is steel, it is preferable that it be machined with the waveform positively biased.

Given the above results, a more desirable way of machining the work piece is realized by using an inverter to selectively switch the direction in which high-frequency AC voltage is supplied in accordance with the materials of which the wire electrode and work piece are composed.

Figure 2:
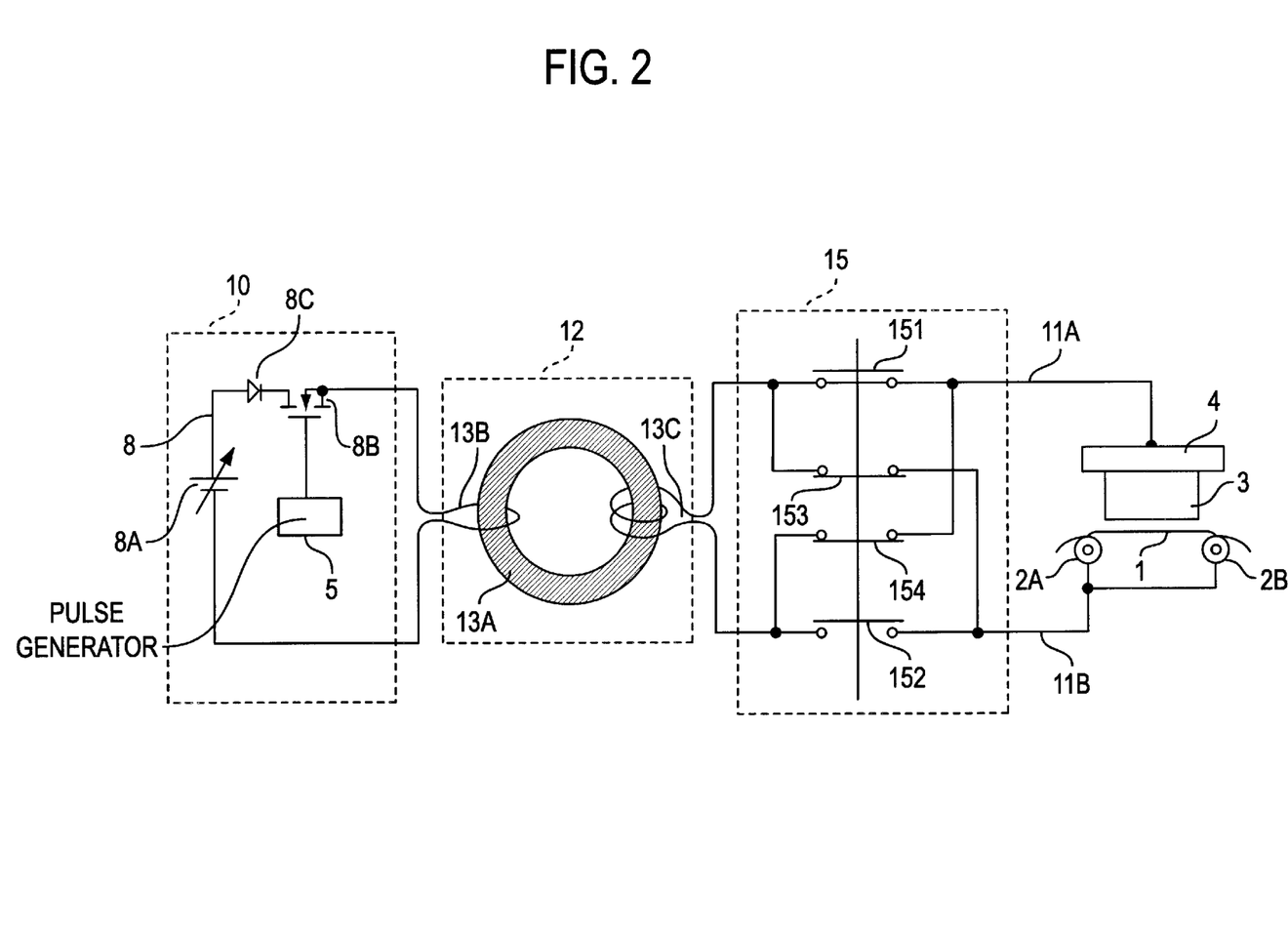
FIG. 2 illustrates a power supply system for a wire-cut electrical discharge machining unit according to another embodiment of the present invention.

FIG. 2 illustrates another embodiment of the present invention. Elements identical to those illustrated in FIG. 1 are noted by the same reference numerals, and will not be further in detail.

The present embodiment differs from the embodiment in FIG. 1 in that the inverting device (15) is provided between the transformer (12) and the machining gap. The four switches of the inverting means (15) are used to invert the direction in which the voltage pulse of the AC current induced on the secondary side of the transformer (12) is supplied. Using this embodiment, the operations performed in machining and the objectives obtained are generally the same as those in the first embodiment. Notwithstanding that the transformer (12) and inverting device (15) are provided on the power supply device (10) side in the present embodiment, when the transformer (12) is placed in close proximity to the machining part, the inverting device (15) is also placed in close proximity to the machining part, i.e., together with the transformer (12).

Figure 3:
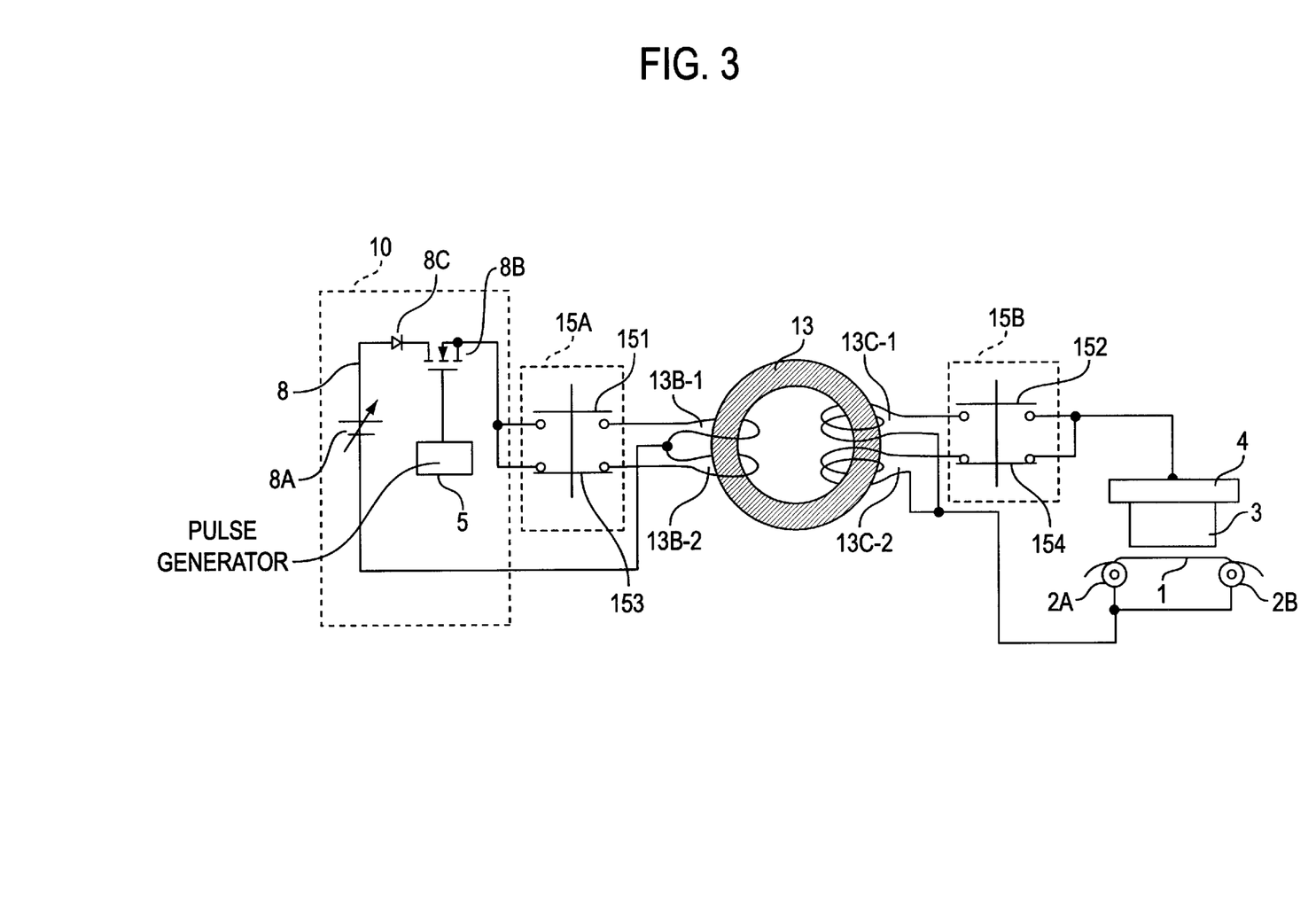
FIG. 3 illustrates a power supply system for a wire-cut electrical discharge machining unit according to yet another embodiment of the present invention.

FIG. 3 illustrates yet another embodiment of the present invention. Elements identical to those illustrated in FIG. 1 are noted by the same reference numerals and will not be further described in detail.

In this embodiment, the inverting device (15) is divided into two units. The first of these is provided between the transformer (12) and power supply circuit (8), and the other is provided between the transformer (12) and the machining gap. The unit (15A) of the inverting device (15) incorporates switches (151) and (153) that operate in opposition to one another, and the unit (15A) incorporates switches (152) and (154). These switch groups are controlled on the basis of signals from a relay circuit (not illustrated).

The transformer (12) incorporates a ring core (13), and primary windings (13B-1) and (13B-2) and secondary windings (13C-1) and (13C-2) wound upon the ring core (13). The respective ends of the two primary windings (13B-1) and (13B-2) are connected to the negative side of the variable DC power supply (8A) and are coupled to each other. In addition, the other end of the primary winding (13B-1) is connected to the switch (151), and the other end of the primary winding (13B-2) is connected to the switch (153). Accordingly, when the switch group of unit (15A) is operated, one of the primary windings conducts, and the other primary winding is blocked. Also, the respective ends of the two secondary windings (13C-1) and (13C-2) connected to the wire (1) are coupled. The other respective ends of the secondary windings (13C-1) and (13C-2) are connected to the work piece (3) via the two switches (152) and (154) of unit (15B) respectively. Accordingly, when the group of switches of the unit (151B) is operated, one of the secondary winding conducts, and the other secondary winding is blocked.

The two primary windings (13B-1) and (13B-2) are wound upon the ring core (13) so as to produce oppositely oriented magnetic flux induced by the current pulse in the ring core (13), and the two secondary winding (13C-1) and (13C-2) are wound in the same way. For this reason, when the primary winding (13B-1) and the secondary winding (13C-1) conduct or the primary winding (13B-2) and the secondary winding (13C-2) conduct to form an electrical discharge circuit, the first half-wave of the AC voltage pulse cycle is supplied to the positive side with the work piece made positive. Accordingly, as explained earlier, the average value of the continuously supplied AC voltage pulse is biased to the positive side. On the other hand, when the primary winding (13B-2) and secondary winding (13C-1) conduct, or when the primary winding (13B-1) and secondary winding (13C-2) conduct to form an electrical discharge circuit, the first half-wave of the AC voltage pulse cycle is supplied at a negative polarity relative to the work piece potential. As a result, the average voltage is biased to a negative polarity. In this manner, the waveform of the AC voltage pulse supplied to the machining gap can be biased to a positive or negative polarity by selectively connecting the primary and secondary windings.

Therefore, the present embodiment consequently possesses the same effect as the embodiment illustrated in FIG. 1.

Figure 6:
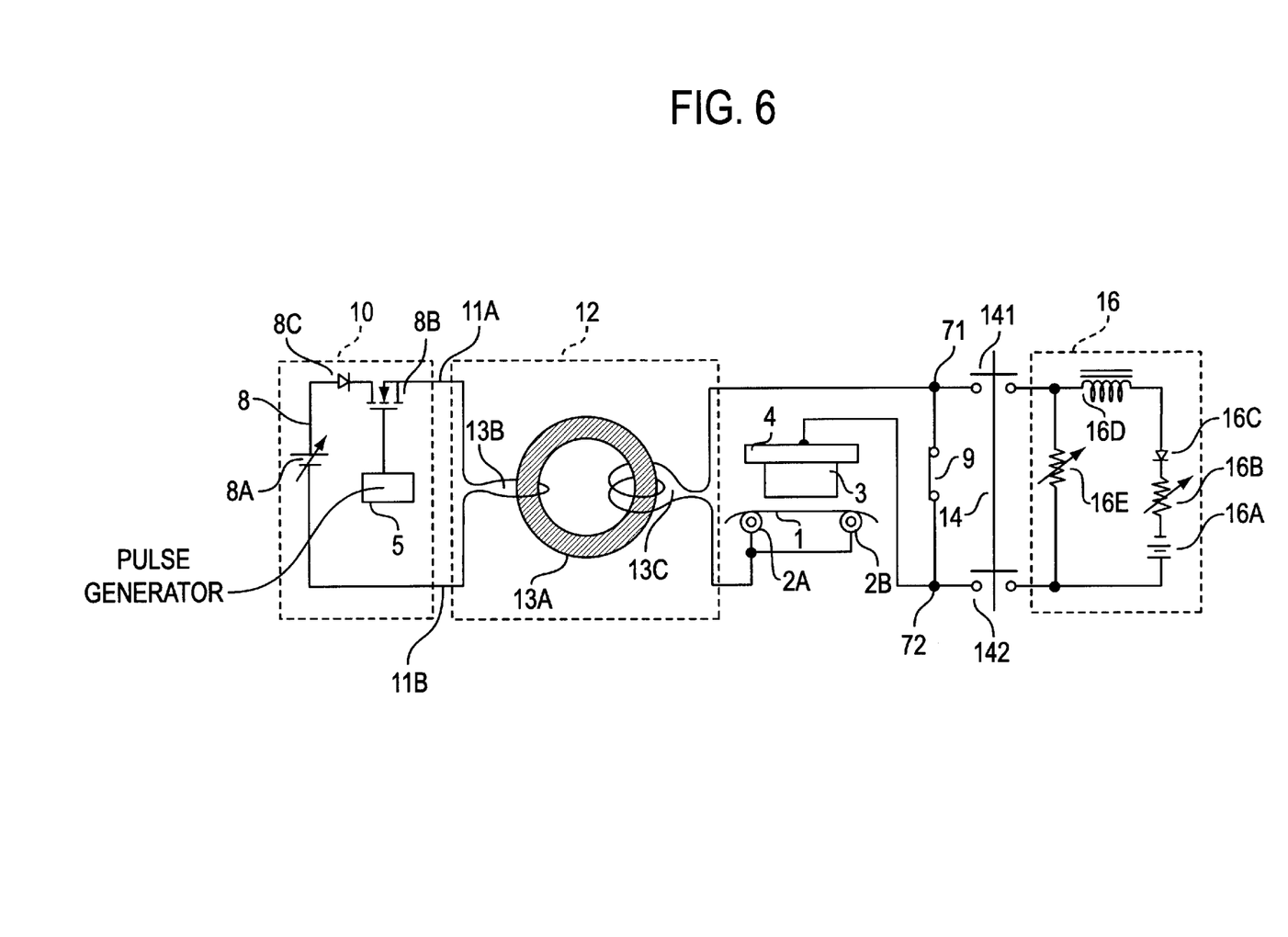
FIG. 6 illustrates a power supply system for a wire-cut electrical discharge machining unit according to yet another embodiment of the present invention.

FIG. 6 illustrates yet another application example of the present invention. Elements identical to those that have already been explained are noted by the same reference numerals and will not be further explained in detail.

When a continuous high-frequency DC current pulse is supplied to the primary side of the transformer (12) from the power supply circuit (8) as the switching element (8B) is switched ON and OFF, a continuous high-frequency AC voltage pulse is supplied to the machining gap with its first half-wave making the work piece positive and its subsequent half-wave making the work piece negative. The DC bias power supply device (16) incorporates a serial circuit comprising a DC power supply (16A), a variable resistor (16B), diode (16C), and a reactor (16D) that prevents high-frequency oscillation. A non-inductive resistor (16E) with a low resistance value is connected to this serial circuit in parallel.

The two terminals of the bias power supply device (16) are respectively connected to two terminals (71) and (72) on the circuit path linking the transformer (12) and work piece (3). Ganged switches (14), comprising a switch (141) between one terminal of the DC power supply (16A) and the terminal (71), and a switch (142) between the other terminal of the DC power supply (16A) and the terminal (72) are provided. The switches (14) synchronously close and open, thereby respectively connecting and disconnecting the bias power supply device (16) from the electrical discharge circuit. Moreover, a switch (9) is provided between the terminals (71) and (72) on this circuit path. When the switch (9) is closed, and the switches (14) are open, the bias power supply device (16) is disconnected from the electrical discharge circuit. Thus, a high-frequency AC voltage pulse is supplied to the machining gap via the switch. Alternatively, when the switch (9) is opened, the switches (14) are closed, DC voltage is supplied from the DC power supply (16A) of the bias power supply device (16). At this time, the DC voltage of the bias power supply device (16) is supplied to the machining gap via the circuit of the non-inductive resistor (16B) so as to cancel out the output of the first half-wave of the high-frequency AC voltage pulse cycle supplied from the transformer (12) with the work piece made positive. Alteratively, the DC voltage of the bias power supply device (16) may be serially supplied to the output during the subsequent half-wave of the high-frequency AC voltage pulse cycle with the result that the work piece is made negative. As a result, the waveform of the high frequency AC voltage pulse supplied to the machining gap is biased to a positive polarity relative to the work piece potential. The extent of this bias varies with the voltage value of the DC power supply (16A), and can be adjusted by altering the resistance value of the resistor (16B) or the non-inductive resistor 16E.

As a result, the present embodiment prevents undesirable coating of the work piece in the same way as in the previous group of embodiments.

The group of illustrated embodiments explained above were selected for the purpose of explaining the essence of the present invention and its practical applications. The present invention is not intended to be limited to the forms that have been disclosed herein, but can be improved and varied in a variety of ways. For example, the inverting device can be provided in any location that corresponds favorably with its design and operation, and can also be combined with the bias power supply device. Moreover, the invention is not limited to using only the power supply circuit (8), e.g., it is also possible for a power supply circuit provided with a resistor in series with a DC power supply, or a power supply circuit incorporating a DC power supply having a voltage higher than that of the DC power supply (8A), to be connected in parallel to the power supply circuit (8). Naturally, the concrete configurations of the inverting device, conversion device, or bias power supply device need not be the precise configurations as illustrated and described in connection with the disclosed embodiments.

The scope of the present invention is to be defined by the appended claims.

We claim:

1. A power supply system for an electrical discharge machining device for supplying power pulses to a machining gap formed between a tool electrode and a work piece to machine the work piece by electrical discharges, said power supply system comprising:

a serial circuit comprising a DC power supply and at least one switching element;

a pulse generator for supplying a gate pulse having a specified ON time and OFF time to said switching element for turning the switching element ON and OFF;

a DC to AC converter connected between the machining gap and the serial circuit for converting DC pulses from said switching element to AC pulses; and an inverter connected between the machining gap and the serial circuit for inverting the polarity of the AC pulses as applied across the machining gap.

2. The power supply system according to claim 1, wherein the DC to AC converter comprises a ring core, at least one primary winding wound on the ring core and connected to the serial circuit, and at least one secondary winding wound on the ring core and connected to the machining gap.

3. The power supply system according to claim 1, wherein the inverter is connected between the serial circuit and the DC to AC converter.

4. The power supply system according to claim 1, wherein the inverter is connected between the DC to AC converter and the machining gap.

5. The power supply system according to claim 1, wherein the inverter comprises a first switching unit connected between the DC power supply and the DC to AC converter, and a second switching unit connected between the DC to AC converter and the machining gap.

6. The power supply system according to claim 5, wherein the DC to AC converter comprises a ring core, a plurality of primary windings wound on the ring core and connected to one of the first switching unit and a plurality of secondary windings wound on the ring core and connected to the second switching unit.

7. The power supply system according to claim 4, wherein the inverter comprises a switching unit for switching the connection between the DC power supply and the machining gap.

8. The power supply system according to claim 7, wherein the switching means comprises a plurality of switches that are relay switches.

9. A power supply system for electrical discharge machining devices for supplying power pulses to a machining gap formed between a tool electrode and a work piece to machine the work piece by electrical discharge, said power supply system comprising:

a serial circuit comprising a DC power supply and at least one switching element;

a pulse generating means for supplying a gate pulse having a specified ON time and OFF time for turning the switching element ON and OFF;

a conversion means between the machining gap and the serial circuit for converting a DC pulse from said switching element to an AC pulse; and a bias power supply device including a DC bias power supply connected to a pair of terminals on a circuit path connecting the conversion means and the machining gap, a pair of switches respectively positioned between ends of the DC bias power supply and the two terminals, and a switch between the two terminals on the circuit path.

10. A method for supplying a power pulse to a machining gap formed between a tool electrode and a work piece so as to machine the work piece by electrical discharge machining, the method comprising the steps of:

controlling at least one switching element to be ON or OFF to generate DC pulses having a specified ON time and OFF time;

converting the DC pulses to AC pulses said AC pulses having an average voltage which is biased to either a positive or a negative polarity relative to the potential of the work piece with respect to the tool electrode;

inverting the polarity of the AC pulses to the opposite of the aforementioned polarity; and supplying the inverted polarity AC pulses to the machining gap to machine the work piece.

11. The method according to claim 10, wherein the step of supplying further comprises the step of biasing the AC pulses, having an average voltage which is biased to either a positive or negative polarity relative to the potential of the work piece, to the opposite polarity prior to the step of converting.

12. The method according to claim 10, wherein the step of supplying further comprises the step of inverting the direction in which the AC pulses are supplied to the machining gap.

13. A method for supplying a power pulse to a machining gap formed between a tool electrode and a work piece so as to machine the work piece by electrical discharge machining, comprising the steps of:

controlling at least one switching element between an ON and OFF state to generate a train of DC pulses having a specified ON time and OFF time;

converting the DC pulses into AC pulses, the AC pulses being biased so that their average voltage is negative relative to the potential of the work piece with respect to the working electrode;

supplying the negatively biased AC pulses to the machining gap; and machining the work piece whereby undesirable coating of the electrode material onto the surface of the work piece is prevented.

14. The method according to claim 13, wherein the tool electrode contains copper, and the work piece is a material selected from a group of materials containing tungsten carbide and copper.

* * * * *